(No Model.)
H. MOESER.
MEANS FOR PREVENTING LEAKAGE FROM GAS CONDUCTING MAINS.
No. 310,841. Patented Jan. 13, 1885.
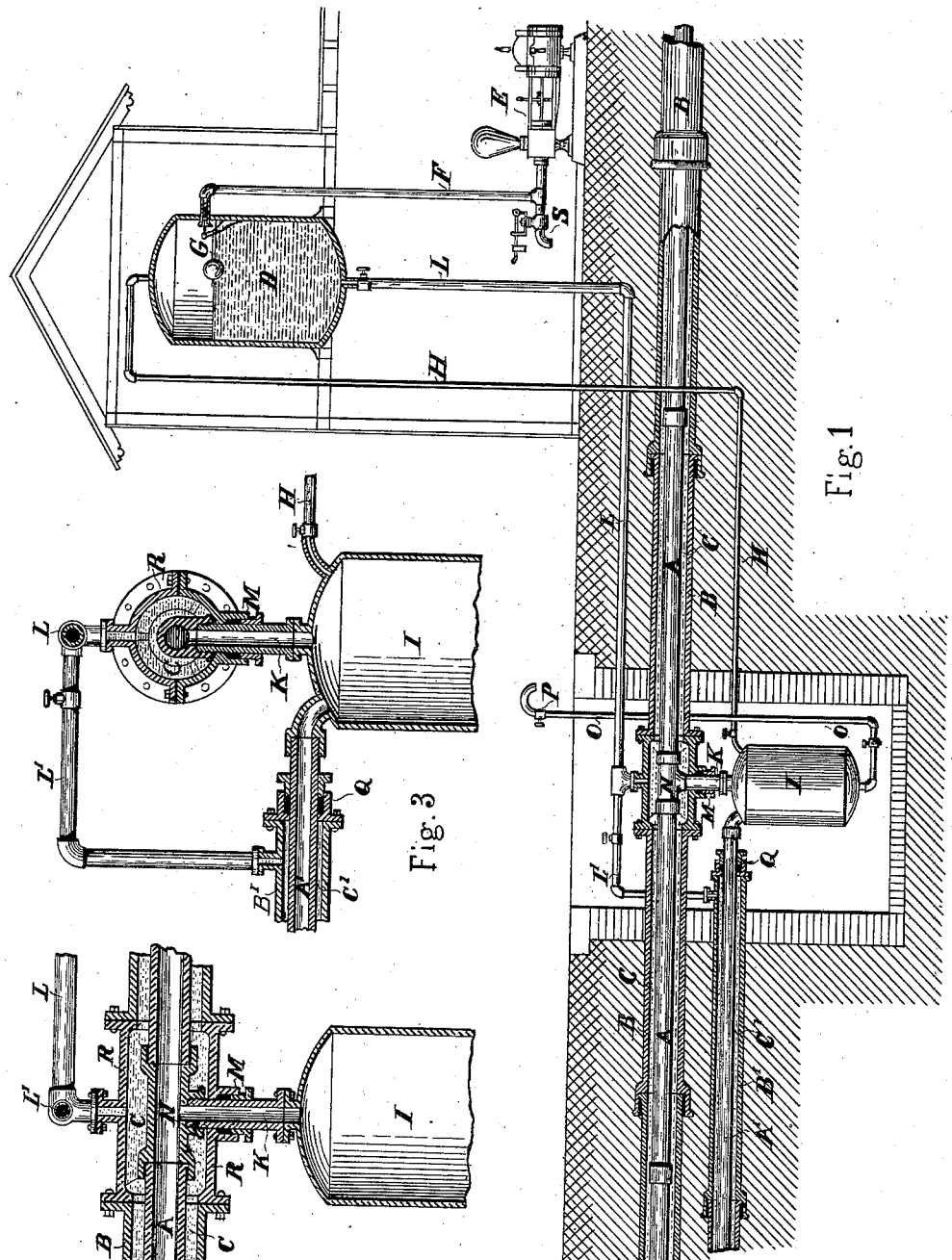

UNITED STATES PATENT OFFICE.

HENRY MOESER, OF ALLEGHENY, PENNSYLVANIA.

MEANS FOR PREVENTING LEAKAGE FROM GAS-CONDUCTING MAINS.

SPECIFICATION forming part of Letters Patent No. 310,841, dated January 13, 1885.

Application filed September 25, 1884. (No model.)

*To all whom it may concern:*

Be it known that I, HENRY MOESER, a citizen of the United States, residing in the city and county of Allegheny, and State of Pennsylvania, have invented a new system and improved means for preventing leakage or undue escape of gas from such pipes or tubes as may be used for its conduction from one location to another, or from the place of its production to that of its storage or utilization; and the invention I have made is intended and specially designed to be used in connection with one or more receiving and distributing pipes adapted to and employed for the transmission of the so-called "natural gas," issuing from deep wells or borings sunk down into the gas-bearing strata of the earth. This subterranean natural gas when given vent issues from the earth with wonderful force, exhibiting a high degree of pressure that makes it difficult to confine, in consequence of the various joints and imperfections in the pipes hitherto used for its conduction. This natural gas is very combustible, and in burning generates intense heat, and when mixed with a certain proportion of atmospheric air becomes highly explosive, and, being odorless, should it leak or escape from its conduit in or about a dwelling-house or factory it might, undetected by sense of smell, accumulate in such quantities as to make it absolutely dangerous.

The object of my invention is to provide a system and means whereby this natural gas may be safely transmitted through pipes made incapable of leakage by surrounding and inclosing the same in a body of water kept under a higher degree of pressure than that of the gas, so as to oppose or counteract that pressure with which the gas strives to escape through the joints, pores, minute openings, or other imperfections in its conduit-pipe by the superior pressure of the water surrounding said pipe, and thus completely prevent any leakage of gas therefrom.

The nature of my invention and the means I employ to produce the requisite effect will be readily understood from the following description, taken in connection with the accompanying drawings, wherein—

Figure 1 represents a longitudinal section of my improved system of gas-conducting pipes, inclosed in a casing containing a body of water under pressure, and means for maintaining the same; Fig. 2, a longitudinal section, in enlarged scale, of a portion of the main line, provided with a receptacle for leakage-water in connection with pipes leading thereinto; Fig. 3, a transverse vertical section of the same portion of the main line and its receptacle for leakage-water, illustrating, also, the connection of a branch conduit-pipe with said receptacle.

To put my invention into practice, I provide a main line of pipe, A, for conducting the gas from the well to a place designed for its storage or utilization, which pipe should be of suitable material, formed in convenient sections joined together at their ends, after the manner generally adopted for such purposes. Inclosing this entire line of gas-conduit A is a substantial casing, B, of such diameter and construction as will form an intermediate and continuous circular chamber, C, between it and the inclosed pipe A, which chamber C is completely filled with water from one of the reservoirs D, located along the pipe-line at suitable distances from each other. These reservoirs D are of suitable size, and made perfectly air-tight, and are placed at a higher elevation or altitude than the line of the conduit-pipes A. Each reservoir D is supplied with water by means of a force-pump, E, which may be operated by steam or gas power. The water is forced from the pump to the reservoir through a pipe, F, to which a safety or escape valve, S, is attached. The water in the reservoir D is always kept at a uniform height by means of a float, G, operating in conjunction with a valve provided at the mouth of the supply-pipe F for stopping the inflow of water when it has reached its determined height, and all surplus water is allowed to escape through the relief-valve S. The top portion of the reservoir D is filled with gas supplied to it by the pipes H, through which the gas is conducted from the receptacle I to the reservoir. The receptacle I communicates directly with the main conduit-line A by the pipes K, and is filled with gas therefrom. By this arrangement the water in the reservoir D is constantly kept under or at the same degeee of pressure as that of the gas in the conduit-pipe A. By a pipe, L, the water in the reservoir D is made to flow into the circular chamber C along the main line of the gas-conducting pipe A and fill the same, whereby the water in said chamber is subject not only to the degree of pressure exerted in the reservoir, which is equal to that of the gas in the conduit-pipe, but also to the additional pressure produced by a column of water of a height equal to the difference between the altitude of the water-level in the reservoir D and that of the line of conduit-pipes A. This additional or surplus pressure of the water in the chamber surrounding the gas-conduit constitutes the agency and the means by which any leakage of gas from the conduit-pipe A is prevented. By a change of position or location of the reservoir D to a higher or lower altitude in relation to the gas-conduit A the surplus pressure of water may be increased or diminished. Through the connection of the reservoir D with the annular chamber or water-space C, in the manner shown and described, it is evident that such quantities of water as may escape from said chamber by leakage through the joints of the casing or through the joints of the gas-conduit or otherwise is immediately replaced, whereby a constant and uniform water-pressure in the casing and around the gas-conduit is preserved.

While I prefer the arrangement of using the pressure of the gas to act on the water in the reservoir D, and placing it at a higher altitude than the gas-conduit pipes for the purposes described, the same purpose may also be accomplished by using the pressure of compressed atmospheric air, instead of gas, within the reservoir.

For the purpose of removing any leakage-water that may enter the conduit-pipes A from the annular water-chamber C, and also for the purpose of allowing the attachment of branch conduit-pipes for the conveyance and distribution of gas to any desired place of consumption or storage, I provide at intervals along the main conduit-line A certain receptacles I, located at such distances from each other as may be deemed suitable or desirable, which receptacles I are constructed of sufficient strength and perfectly air-tight, being connected with the main gas-conduit A by a pipe, K, which traverses the water-space, and made secure against leakage by passing through a properly-constructed stuffing-box, M. Through this pipe K the gas or leakage-water in the conduit-pipes is allowed to pass freely into said receptacles I, and by means of the pipe O and spigot P any leakage-water accumulating in the receptacle I may be discharged by any automatically-operating arrangement, or otherwise. With this receptacle I a branch gas-conduit pipe, A', is connected, which is also surrounded by a continuous casing, B', and secured against leakage by an intermediate body of water in substantially the same manner as is the main conduit-pipe—that is, by supplying the water space or chamber C' around said branch pipe A' with a constant pressure of water through the pipe L' and its continuation L, that connects it with the elevated reservoir D. The connection of the receptacle I with the main conduit-pipe A is fully illustrated in the sectional drawings, Figs. 2 and 3, which show at this point a short pipe, N, surrounded by a portion, R, of the casing, made in two halves bolted together for the purpose of easy access to the connections of the pipes N and K, arranged therein. At the point where the branch gas-pipe A' enters the casing B' a stuffing-box, Q, has been provided, to secure the same against any escape of water therefrom.

In the construction and operation of my improved means and method of conveying gas under pressure it has been supposed that the line of conduit-pipes are horizontal, or essentially so. If, however, on account of a rise or descent in the grade of the territory through which the pipe-line is laid, it should be necessary to give the pipe-line such an ascent or descent as would disturb or affect the proper pressure of the body of water around the conduit-pipes, and thereby permit a leakage of gas therefrom, the remedy is as follows, to wit: In place of a continuous water-space around the gas-conduit pipes, I divide the same into convenient sections having no communication with each other, and for the water-supply of each section I provide one or more reservoirs. This arrangement enables me to preserve the proper pressure of water in the space or chamber around the line of conduit-pipes whether the latter are located on higher or lower territory.

In my improved method of conveying gas under pressure all the joints of the conduit-pipes, as well as of the casing around the same, are to be fitted or packed to resist the penetration or leakage of water only, while in the ordinary methods heretofore in use the joints had to be made so as to resist the penetration or leakage of gas.

Owing to the subtle nature of gas, the prevention of its leakage is attended with greater difficulties than that of water. Besides, any leakage of water through the joints of the casing will be comparatively harmless, when that of the gas is highly dangerous.

To protect the water used in my improved conduit-pipe line against frosts, the pipes should be laid a sufficient depth below the surface of the earth, or otherwise made secure, and the reservoirs and other parts or portions of the apparatus should be properly housed.

Having thus described my invention and the means employed to give the same practical form, I claim—

1. The herein-described means of maintaining an equable water-pressure around a gas main or pipe, consisting in conducting the said gas under pressure to a reservoir or receptacle, and then conducting the accumulated gas to a water-reservoir having communication to the water-envelope around the said gas-pipes, substantially as and for the purpose specified.

2. The herein-described means of maintaining an equable water-pressure around a gas-pipe, consisting in conducting the said gas under pressure to a reservoir or receptacle, and then conducting the accumulated gas to an elevated water-reservoir in which the water is maintained at a general level, the gas adding to the gravity-pressure of the said water on the water-envelope, substantially as and for the purpose specified.

3. The combination of a conduit-pipe for conveying gas, a casing around said pipe, and an intermediate encircling space or chamber, an inlet-pipe and reservoir for supplying said chamber with water, and a close vessel for the reception of such water as may find its way by leakage from the chamber into the conduit-pipe, and a valve or spigot whereby the leakage-water may be discharged or blown out.

4. The combination of a conduit-pipe for conveying or transmitting gas under pressure, a casing around the same, forming an intermediate encircling space or chamber, an inlet-pipe and reservoir for supplying said chamber with water, and a pipe for conducting a portion of high-pressure gas into the reservoir above the water therein, whereby an elastic gaseous force is used to exert a pressure on the water in the reservoir equal to that in the conduit-pipe, and enable the column of water entering and supplying the encircling-chamber from the reservoir to give or produce an additional pressure around the inclosed conduit-pipe corresponding to the difference between the altitude of the water-level in the reservoir and that of the line of said conduit-pipe.

5. The combination of a conduit-pipe for transmitting gas under pressure, a casing around the same, forming an intermediate encircling space or chamber, an inlet-pipe and reservoir for supplying said encircling-chamber with water, a suitable closed vessel for receiving any leakage of water that may find its way from the chamber into the conduit-pipe, and a branch gas-conduit leading therefrom and inclosed by a casing and water-chamber connected with said reservoir.

6. The combination of a conduit-pipe for transmitting gas under pressure, a casing around the same, forming an intermediate encircling space or chamber, an inlet-pipe and reservoir for supplying water thereto, a pipe leading from said gas-conduit into a vessel provided with a means for forcing out or blowing off any water that may enter therein, and a portion of the casing around the main line or gas-conduit pipe, made in two or more pieces joined together and to the general line of casing in such a manner as to admit of being removed for easy access to the pipes within.

HENRY MOESER.

Witnesses:
A. H. MOESER,
W. C. BARR.